UNITED STATES PATENT OFFICE.

HENRY STALAY ARTHUR HOLT AND KARL REINKING, OF LUDWIGSHAFEN-ON-THE-RHINE, ASSIGNORS TO BADISCHE ANILIN & SODA FABRIK, OF LUDWIGSHAFEN-ON-THE-RHINE, GERMANY, A CORPORATION.

PROCESS OF PRINTING INDIGO COLORING-MATTER.

No. 826,428.　　　Specification of Letters Patent.　　　Patented July 17, 1906.

Application filed August 4, 1905. Serial No. 272,764.

*To all whom it may concern:*

Be it known that we, HENRY STALAY ARTHUR HOLT, a subject of the King of England, and KARL REINKING, a subject of the Prince Regent of Brunswick, doctors of philosophy and chemists, residing at Ludwigshafen-on-the-Rhine, in the Kingdom of Bavaria, German Empire, have invented new and useful Improvements in Processes of Printing Indigo Coloring-Matters, of which the following is a specification.

The method hitherto almost exclusively employed for printing indigo on vegetable fiber is the following: The material to be printed with indigo is first padded with a solution of glucose and then is printed with a strongly-alkaline paste which contains indigo. The material thus treated is then dried and afterward subjected for a short time to the action of steam free from air and is washed to develop the color.

We have discovered that maltose can be used instead of glucose and that the whole process is thereby considerably cheapened. The maltose used may be the unpurified product, or it may be used in the condition of a solution. The matters which it is preferred to use, on account of their cheapness, are the solutions which can be obtained by treating starch paste with extract of malt or with other matter which contains diastase. It is not necessary to make use of pure starch in the preparation of such solutions. When such solutions are used, good results are obtained, which are fully as good as those obtained when a glucose solution of the same specific gravity is employed, and although maltose is regarded as possessing only two-thirds of the reducing power of glucose we have found that less is needed in our process than if glucose be used.

The following example illustrates a method of preparing a solution of maltose suitable for use according to our invention; but our invention is not limited to the use of this particular preparation. The parts are by weight. Boil one hundred (100) parts of wheat-starch with water to a paste and while at a temperature of from sixty to seventy degrees centigrade (60° to 70° C.) add two (2) parts of "diastafor" or a corresponding quantity of malt extract and maintain the mass at this temperature until no more starch remains unconverted. The time generally required is about from three to four hours. When the reaction is complete, (which is shown by the solution giving no blue coloration with iodin,) bring the solution to a specific gravity of 1.052 and pad the material with it. The printing and subsequent operations may be such as are used when a solution of glucose has been employed. They may, for instance, be such as are employed in Schlieper's glucose process. In this example inferior starch—such, for instance, as that obtainable from rice refuse—may be employed instead of wheat-starch.

Now what we claim is—

The improvement in the process of printing indigo on vegetable fiber which improvement consists in padding the material with a solution of maltose before printing, with indigo, the material so padded.

In testimony whereof we have hereunto set our hands in the presence of two subscribing witnesses.

HENRY STALAY ARTHUR HOLT.
　　　　KARL REINKING.

Witnesses:
　J. ALEC. LLOYD,
　Jos. H. LEUTE.